United States Patent [19]
Mason

[11] Patent Number: 5,320,208
[45] Date of Patent: Jun. 14, 1994

[54] RECIPROCATING LIFT MECHANISM

[75] Inventor: Arthur C. Mason, Mt. Clemens, Mich.

[73] Assignee: Utica Enterprises, Inc., Shelby Township, Macomb County, Mich.

[21] Appl. No.: 909,084

[22] Filed: Jul. 2, 1992

[51] Int. Cl.⁵ .............................................. B65G 37/00
[52] U.S. Cl. .................................. 198/346.2; 74/105; 74/110
[58] Field of Search .......................... 198/345.1, 346.2; 74/105, 110

[56] References Cited

U.S. PATENT DOCUMENTS

| | | | |
|---|---|---|---|
| 3,745,868 | 7/1973 | Prentice | 74/110 X |
| 3,789,676 | 2/1974 | Brems | 74/27 |
| 4,295,780 | 10/1981 | Wada et al. | 414/749 |
| 4,398,627 | 8/1983 | Saccani | 198/346.2 |
| 4,416,198 | 11/1983 | Rasenberger | 101/3 R |
| 4,494,282 | 1/1985 | Ida et al. | 198/465.1 X |
| 4,545,266 | 10/1985 | Brems | 74/103 |
| 4,600,095 | 7/1986 | Brems et al. | 198/346.2 |

Primary Examiner—H. Grant Skaggs
Assistant Examiner—Cheryl L. Gastineau
Attorney, Agent, or Firm—Remy J. VanOphem

[57] ABSTRACT

The present invention teaches method and apparatus for a single stroke kinematic system, having a required mid stroke dwell, which permits positioning of the mid stroke dwell with respect to both space and time. A four bar linkage mechanism is disclosed having a bottom stroke and a top stroke toggle thereby kinematically providing the acceleration ramps into and out of the bottom stroke and top stroke dwells. A cycloidal drive mechanism is provided to drive the four bar linkage and providing time/phase shifting of the cycloidal drive's mid cycle dwell.

9 Claims, 8 Drawing Sheets

RECIPROCATING LIFT MECHANISM

BACKGROUND OF THE INVENTION

1. Field of the Invention

The invention relates to a mechanical, straight-line, four bar lift mechanism suitable for use on a conveyor assembly line wherein workpieces, transported along a conveyor, are gently lifted vertically, in a straight-line, from the conveyor while the mechanism moves through a dwell and then rapidly accelerates upwardly to an overhead work station where the linkage reaches a dwell such that work may be performed upon the workpiece and, thereafter, the workpiece is returned to the conveyor and the mechanism continues to travel below the conveyor to a dwell while in an at rest position.

2. Description of the Prior Art

Straight-line linkage mechanisms are well known for transferring workpieces into and out of a press or machine and are most advantageous in such applications because of the accuracy of positioning the workpieces at the beginning and end of travel of the respective mechanism. For example, U.S. Pat. No. 4,295,780 teaches a straight-line linkage apparatus for automatically transferring workpieces which is characterized by extremely consistent movements during the starting and stopping stages thereof as well as by accurate stop positions thereof. This characteristic is provided by the fact that the velocity characteristics of the linkage and crank mechanism closely resembles that of a sine curve, which curve has longer or smoother foot portions to thereby allow smooth starting and stopping motion of the linkage mechanism. In fact, the linkage approaches a dwell at the start and stop positions.

Another widely used straight-line linkage mechanism is the so called Scott-Russell mechanism wherein an oscillating link in combination with a plurality of intermediate links is arranged to provide an approximate straight-line travel of the output link.

The above straight-line mechanisms are often criticized because of their instability where there is side loading on the mechanism in a direction transverse to the generated straight-line as the links travel through their respective arcuate motions to provide a straight-line output to the output links. These mechanisms are also generally bulky since the links must pass over each other making it difficult to provide a construction which is capable of reacting to transverse loads.

U.S. Pat. No. 4,545,266 to Brems attempts to resolve some of the shortcomings of the above described problems associated with straight-line linkage mechanisms. Brems teaches a mechanical linkage system for generating a straight-line utilizing links which do not cross over in the motion generated. The disclosed linkage teaches a rigid bell crank member which has a center pivot connection to a first suspension link, a second pivot connection to a substantially linear guide mechanism and a third pivot connection to an output point, the dimensions of the link, the distance between the outer pivot connection and the guide mechanism, and between the center pivot and the output point are generally equal allowing the mechanism to be used as a linear slide or a straight-line linkage.

Although such mechanical linkage overcomes the shortcomings of the Scott-Russell mechanisms, there are still numerous problems associated with the Brems straight-line linkage as utilized in wide applications. For example, such straight-line linkage is utilized in a welding press in U.S. Pat. No. 4,600,095 to Brems to elevate a platen from a rest position spaced below a conveyor to an elevated position and during this straight-line movement a workpiece is picked up from the conveyor by the lower tooling attached to the platen and moved to an upper position against tooling attached to the upper portion of the press to perform welding operations to the workpiece. To utilize the Brems straight-line linkage additional structure is required in the base of the welding press in order to accommodate the sliding pivot support. Further, the larger links that are required to be of equal length to make the straight-line mechanism operate according to the teachings of the invention occupy significantly more space than a Scott-Russell mechanism as well as demand special considerations in designing a counterbalance which resides within the confines of the platen. Because of the limitations of the attachment points to the platen, the side thrust capabilities of the welding knee are further limited. Finally, and most important, the straight-line linkage apparatus completely disregards the velocity of the input and output attachment links, resulting in the output and input links at the beginning and end limits of travel moving at relatively high velocity, requiring significant compensation in the parameters of the associated cycloidal drive in order to account for the high inertia forces at the uppermost and lowermost position of the platen. The bulkiness of the linkage, limitation of side thrust capabilities, and associated inertia forces of not only the links but the weight of the tooling carried by the platen (up to 5 tons) has resulted, at times, in unwanted vibration and instability of the mechanical welding knee.

Accordingly, what is needed is a mechanical welding press which provides desired lift characteristics without forfeiting optimum lift kinematic characteristics in favor of the straight-line kinematic requirements. Such a mechanical linkage system would produce a motion approaching a dwell at the beginning and ending limits of its motion as well as provide an intermediate dwell, variable as a function of time so that a workpiece may be elevated on a platen of a welding press with a straight-line vertical motion in two successive steps to first engage a workpiece on a conveyor located between the uppermost and lowermost position of travel and then elevate the workpiece to a work station above the conveyor. Thereafter, the mechanical linkage system lowers the platen with a straight-line vertical motion in two successive steps to first deposit the workpiece on the conveyor and then return to its starting position. The horizontal location of the conveying system will vary and accordingly the mechanism must be adjustable to variation of the midpoint pick up. For example, Rasenberger, U.S. Pat. No. 4,416,198, teaches a drive for producing motion for a printing press with intervening dwells including a four bar linkage defining a couple curve travel path traversable only in part and having equally coincident forward and return paths, and a dwell-producing driven rocker arm pair connected thereto, the couple curve travel path having a vertex therein dividing the couple curve travel path into a short curve path for producing a dwell and an elongated curve path extending at an angle to the short curve path for producing a movement, the vertex of the couple curve being identical with one instantaneous pole defining the start and end of the dwell. In view of the requirements outlined above with respect to a mechanical welding press, the teachings of this drive for producing dwells are not suited for a mechanical welding press application. For example, the linkage as described acquires only one dwell from the four bar linkage, the other dwell being generated by a harmonic input drive. The extended dwell created in the four bar linkage is a function of the position of the links not a velocity function. Further, the dwell apparatus is taught to be run with a single direction drive while a reversing drive is essential for a four bar linkage application having a dwell generated at both ends of travel with a variably occurring dwell therebetween, as will be made clear hereinafter. Finally, the drive for producing motion with dwells as taught in Rasenberger is very complex.

Brems, U.S. Pat. No. 3,789,676, teaches a reciprocating drive mechanism for transmitting an output motion with predetermined acceleration and velocity characteristics which provides a dwell at the beginning and end of its travel as well as a dwell timed precisely at the midpoint of total time traveled between the beginning and end position of its travel. This is accomplished by a lift mechanism powered by a reversible electric motor through a gear box. The output shaft of the gear box has a crank mounted thereon on which is located a fixed gear. A gear rack meshes with the fixed gear and is retained in engagement therewith by a bracket that is journalled on the axis of the fixed gear by a shaft. The pitch line of the teeth of the fixed gear passes through the axis of an output shaft. This arrangement generates a cycloidal motion to the gear rack which is shown in prior art FIG. 13.

The problem associated with utilizing a cycloidal drive to provide dwells at both ends of travel as well as at its midpoint is that the links associated with this type of drive provide a harmonic dwell at least one end (beginning or ending) of its travel which is required to lock up the platen in order to counteract the downward force generated by the tooling mounted in the welding press as it performs work on the workpiece. Further, the cycloidal drive, as stated above, generates a dwell at both ends of travel and at the precise midpoint in time of the total time to travel through the complete motion of the links. The displacement of the platen to reach the midpoint position in time is therefore very limited since the pickup position for the workpiece must be at the precise midpoint of the total time traveled during the total stroke of the platen, offering little flexibility as to the positioning of the conveyor that travels through the mechanical welding press due to the acceleration and velocity characteristics as a consequence of the pickup position being at exactly the midpoint, in time, of the total time requirement of the complete up and down movement of the platen.

Finally, if the drive is taken to its respective end of travel to its full dwell position, the drive will have infinite power multiplication at the respective end point dwell position, requiring some form of break-away output device as a safety feature to protect the mechanical welding press. Accordingly, what is needed is a four bar linkage system wherein the midpoint dwell of a cycloidal drive is advantageously used to pick up a workpiece from a conveyor system associated with a mechanical welding press and the end point dwells are generated by the four bar linkage itself rather than the cycloidal drive in order to avoid the additional safety devices associated with the end point dwells of the cycloidal drive as well as to offer adjustability for the occurrence of an intermediate dwell so that the stroke of the platen may be adjustable and the workpieces may be picked up from a conveyor which traverses the welding press between a predetermined range of distances from the bottom dwell position of the platen. Such an arrangement eliminates the potential hazards associated with the cycloidal drive end point dwells and permits a range of midpoint pickups of the workpiece from the conveyor by convenient adjustments of the four bar linkage and associated links between the four bar linkage and the cycloidal drive. Further, because of the linkage system's application to a welding press, the linkage must be able to move approximately 5 ton through a stroke of 18 to 24 inches in less than 2 seconds without vibrations or instability. The lift mechanism should be relatively compact as it must necessarily be positioned below the conveyor. The lift mechanism must be structurally rigid in the lateral, longitudinal, and vertical directions to resist the forces imposed by the work performed on the workpiece and imparted to the lift mechanism by the particular operations performed on the workpiece when the lift mechanism is in the raised position. Naturally, it is desired that the lift mechanism rise rapidly to the conveyor location, gently engage and pick up the workpiece and thereafter again rise rapidly to the end of its upper limit of travel to engage the tooling so that work may be performed on the workpiece. Upon completion of the work operation, the lift mechanism must rapidly descend to the conveyor level, gently deposit the workpiece thereon and descend to its rest position below the conveyor thereby permitting the conveyor to index to the next workpiece whereafter the cycle is repeated.

SUMMARY OF THE INVENTION

The invention is a four bar linkage lifting apparatus wherein a dwell is generated at both the beginning and end limits of its travel (or at both ends of its stroke) such that work may be performed on a workpiece. The workpiece is lifted from a conveyor by the four bar linkage at an intermediate point which is selected to be a variable time function of the total time required to make the full stroke as well as within a predetermined distance of the midpoint of the total stroke of the linkage mechanism during the interval when a dwell is generated by an associated cycloidal mechanical drive which generates a dwell at a precise midpoint of its stroke equidistant between the beginning and end of its stroke or travel. The workpiece mounted to the lower tooling attached to the platen is moved to the end of travel of the four bar linkage to an upper tooling station which performs work on the workpiece. The straight-line motion necessary to provide proper alignment of the tooling may be provided by any convenient mechanism such as a Scott-Russell mechanism or a relatively simple vertical plate attached to the platen which is confined between a set of associated rollers mounted to the surrounding structure. The four bar linkage apparatus teaches kinematically providing beginning and end of stroke dwells including the acceleration and deceleration characteristics into and out of the desired dwells. A cycloidal drive system is preferably employed to drive the lifting four bar linkage mechanism to provide desired acceleration and deceleration characteristics into and out of an intermediate dwell associated with the engagement of a workpiece located on a conveyor traversing the four bar linkage within a predetermined range of locations between the end and beginning positions of the four bar linkage lifting system. Thus, the cycloidal drive is only relied upon to provide an intervening or intermediate dwell, and not the beginning or end of stroke dwells. This unique combination permits the cycloidal drive in combination with the four bar linkage to be "tuned" such that the intermediate dwell need not occur at the precise midpoint of the stroke as is taught by the prior art. The intermediate dwell may now be programmed to allow the four bar lift mechanism to engage the workpiece located on the conveyor, at an infinite number of locations, within a predetermined range above or below the precise midpoint dwell independent of the time element required to travel to the precise pick up point regardless of the midpoint dwell generated by the cycloidal drive mechanism.

DETAILED DESCRIPTION OF THE PREFERRED EMBODIMENT

Referring to FIGS. 1 through 4, a mechanical welding press 10 is generally shown having a conveyor 11 passing therethrough. Positioned upon the conveyor 11 are workpieces 12 which are indexed one at a time into the mechanical welding press 10. A workpiece support table 13, located below the conveyor 11, moves in a straight-line vertical motion to engage the workpiece 12 and lift the workpiece from the conveyor within the welding press, to a position above the conveyor where desired welding operations may be performed upon the workpiece.

Figure 1:
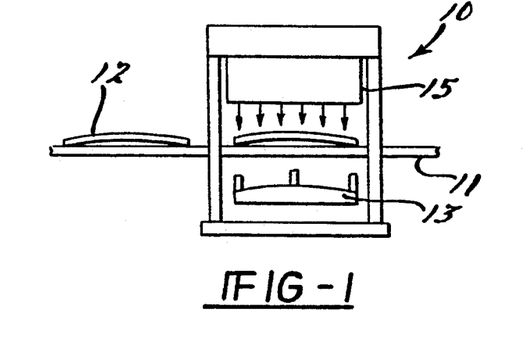
FIGS. 1, 2, 3, and 4 diagrammatically show the operation of a mechanical welding press having a conveyor and a workpiece lifting and lowering table.
Figure 2:
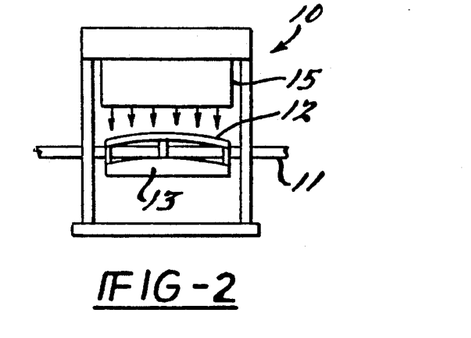
Figure 3:
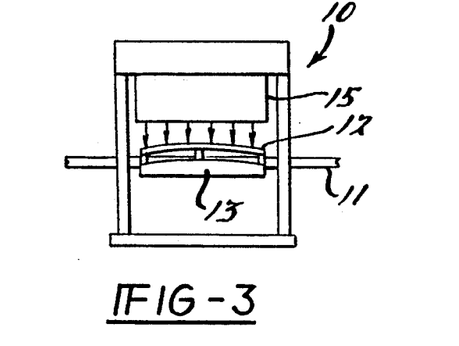
Figure 4:
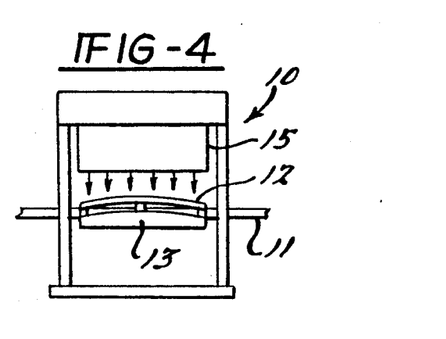

FIG. 1 shows a workpiece 12 positioned upon the conveyor 11 within the mechanical welding press 10 and vertically aligned with upper and lower tools. The upper tooling, generally indicated by reference numeral 15, is attached overhead to the mechanical welding press and the lower tooling is mounted to the workpiece support table 13. FIG. 2 shows the workpiece support table 13 and associated lower tooling engaging the workpiece 12 at the conveyor 11 level during an intermediate dwell of the table lifting system. FIG. 3 shows the support table 13 and associated lower tooling with the workpiece carried thereon, raised vertically to an end point dwell welding position where the desired welding operations are performed upon the workpiece during the end point dwell of the four bar linkage. FIG. 4 shows the support table 13 lowered to the conveyor 11 level, after the welding operation has been performed, whereupon the workpiece 12 is returned to the conveyor 11 during the intermediate dwell position. The support table 13 is then lowered to its at rest position at the beginning point dwell of the four bar linkage as shown in FIG. 1 and the conveyor 11 is indexed to position the next workpiece within the mechanical welding press 10 and simultaneously remove the workpiece whereupon work was performed.

Figure 5:
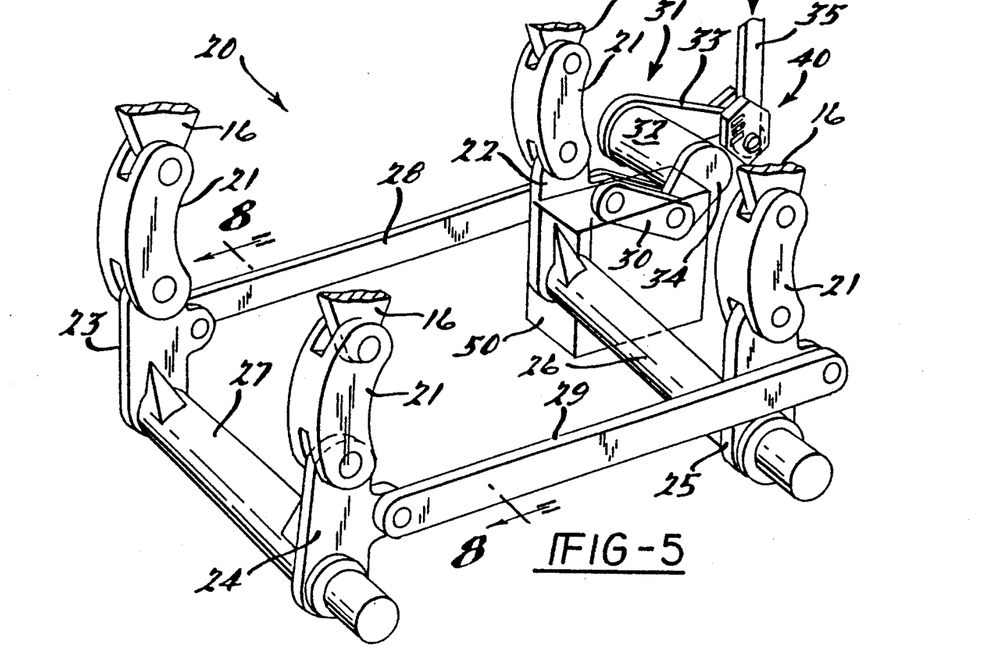
FIG. 5 is a perspective representation of the improved four bar linkage mechanism as embodied in a table lifting system.

FIG. 5 pictorially illustrates an improved four bar linkage mechanism 20 for moving the workpiece support table 13 from a rest position to a vertically extended position as generally depicted in FIG. 3. For purposes of clarity, the workpiece support table 13 is not shown in FIG. 5 except for the workpiece support table attachment brackets 16. The workpiece support table 13 is generally supported by two substantially identical linkage mechanisms 20 spaced apart laterally, each four bar linkage mechanism being attached to the workpiece support table 13 by the longitudinally spaced attachment or mounting brackets 16. Attached to each mounting bracket 16 is a lifting link 21 driven in turn by associated bell cranks 22, 23, 24, and 25, respectively. The bell cranks 23 and 24 are rigidly interconnected by a torque tube 27 and the bell cranks 22 and 25 are rigidly interconnected by a torque tube 26. The bell cranks 23 and 24 are connected to the bell cranks 22 and 25 by drag links 28 and 29, respectively, thereby completing a four bar linkage mechanism at each lateral side of the workpiece support table. Attached to the bell crank 22 is a drive link 30 which is driven by a lever 34. The lever 34 is part of a bell crank assembly 31 that is mounted between a cycloidal drive mechanism 60 shown in FIG. 16 and the four bar linkage mechanism. The bell crank assembly 31 includes a torque tube 32, a lever 33, and the lever 34 axially disposed at each end thereof. The lever 33 of the bell crank assembly 31 is connected to a drive rod 35 by means of a stroke adjustment mechanism 40 which is hereinafter described. The drive rod 35 is preferably driven by the cycloidal drive mechanism 60 shown in FIG. 16 and is further described herein below.

Also positioned below and attached to the workpiece support table is a Scott-Russell straight-line mechanism. The Scott-Russell mechanism has not been shown in detail in FIG. 5 so as not to complicate the figure; however, the general environment of the Scott-Russell mechanism is depicted at the rectangular volume identified as element 50. The preferred embodiment of the Scott-Russell mechanism is shown in detail in FIGS. 12, 13, and 14 and will be described hereinafter.

To provide a better understanding of the overall operation of the improved workpiece support table lifting system, the mechanical linkage system operation is set forth separately from the cycloidal drive mechanism in order to clarify the kinematic characteristics provided by the four bar linkage system apart from the characteristics of the cycloidal drive.

Figure 6:
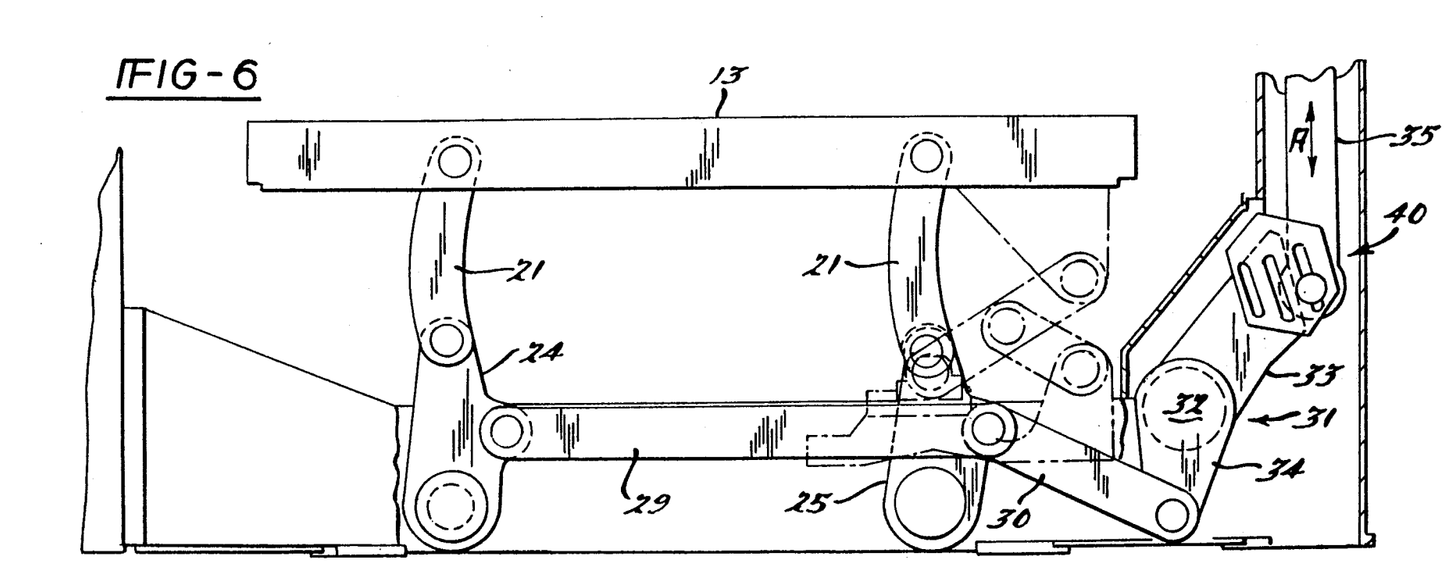
FIG. 6 is a fragmentary longitudinal front view of the improved four bar linkage mechanism with the table lifting system in the full upright position.

Referring to FIGS. 6, 7, 8, 9A, and 9B, FIG. 7 shows the workpiece support table 13 in its at rest position, as depicted in FIG. 1. FIG. 6 shows the workpiece support table in its most vertically extended position as depicted in FIGS. 3 and 5.

Figure 7:
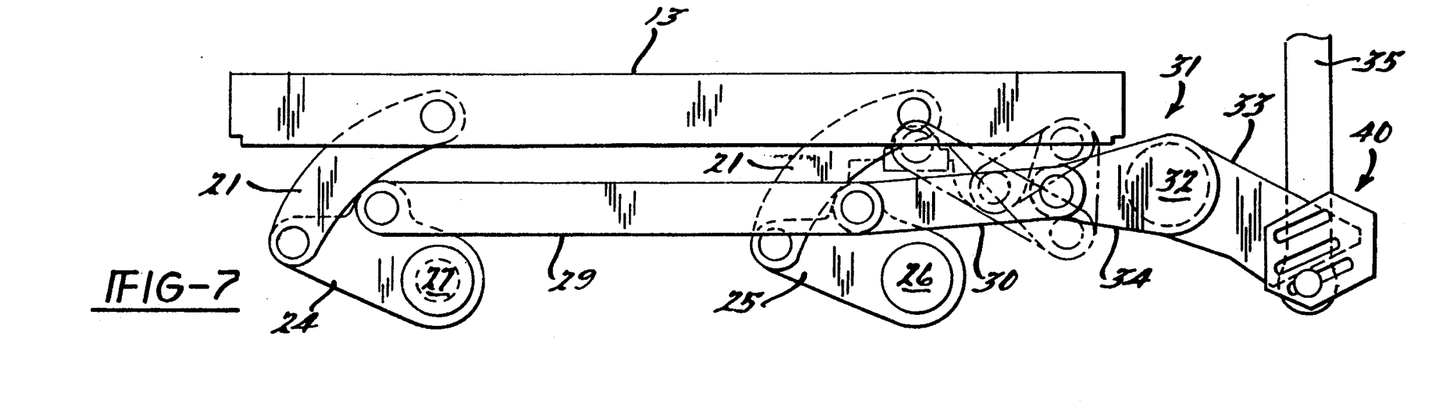
FIG. 7 is a view similar to FIG. 6 showing the four bar linkage mechanism in the fully lowered, at rest, position.
Figure 16:
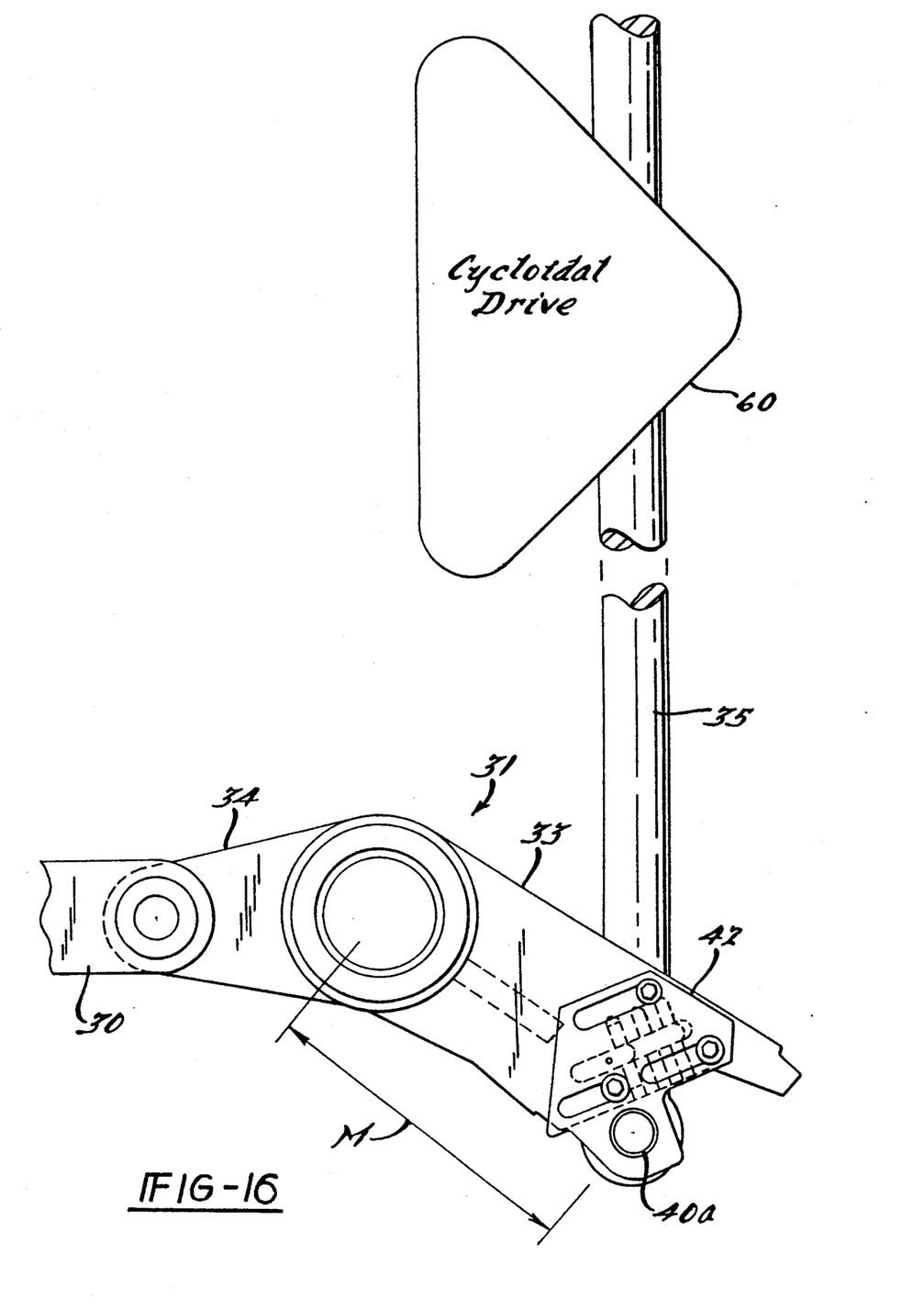
FIG. 16 is a fragmentary elevational view of the improved table lifting mechanism illustrating the interface of the cycloidal drive output with the four bar linkage input.

A cycloidal drive mechanism 60, as shown in FIG. 16, is attached to the drive rod 35 and moves the drive rod 35 in a translatory movement, as indicated by the double arrow A in FIG. 6. Beginning in the at rest position, as illustrated in FIGS. 1 and 7, and schematically shown in FIG. 9A, the cycloidal drive mechanism 60 moves the drive rod 35 upwardly, as viewed in FIGS. 7 and 9A, thereby causing the levers 33 and 34 of the bell crank assembly 31 to rotate counterclockwise. By the counterclockwise rotation of the bell crank assembly 31, the drive link 30 having one end connected to the lever 34 at the pivot 1 is caused to rotate clockwise about its pivotal connection 2 on the bell crank 22 and begin translating to the right as the bell crank 22 pivots about the pivot 3 as viewed in FIG. 9A. As the lever 34 continues its counterclockwise rotation, the drive link 30 effects clockwise rotation of the bell crank 22 about the pivot 3, as seen in FIG. 9A, thereby causing the lifting link 21 to rotate counterclockwise about the pivot 4 on the bell crank 22, and translate to the vertical position as shown in FIGS. 5 and 6, and as schematically shown in FIG. 9B.

Figure 9A:
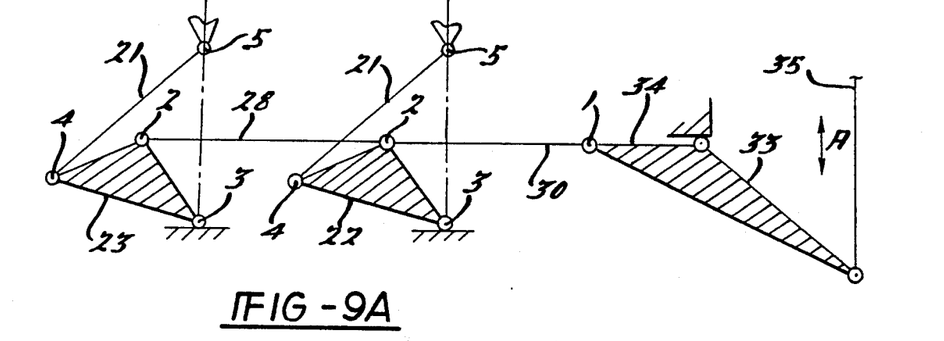
FIGS. 9A and 9B illustrate schematically the beginning and end of stroke dwells of the four bar linkage mechanism in the at rest and fully raised positions, respectively.
Figure 9B:
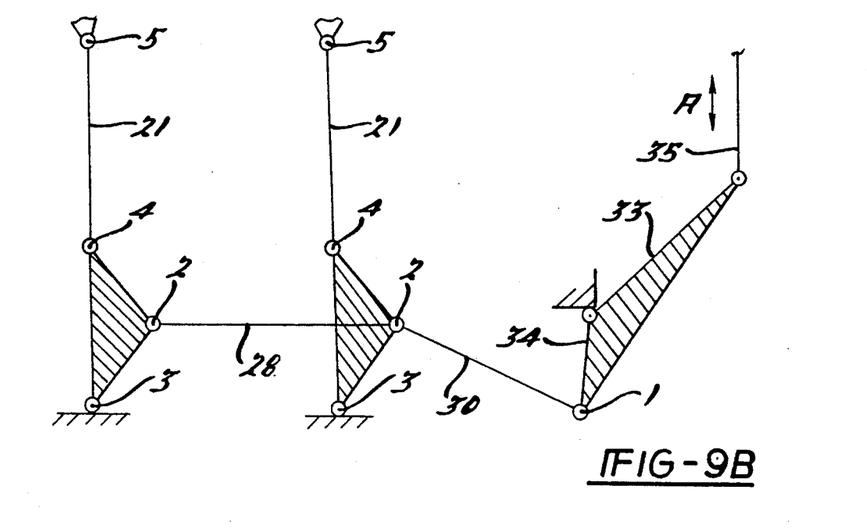

It will be appreciated that since the bell crank 25 is rigidly connected to the bell crank 22 by the torque tube 26 and the bell cranks 23 and 24 are connected to the bell cranks 22 and 25, respectively by the drag links 28 and 29, all four lifting links traverse identical paths as indicated by FIGS. 9A and 9B. It should be kept in mind that the straight-line motion of the lifting links 21 is generated by the Scott-Russell mechanism attached to the workpiece support table 13, as will be discussed hereinafter.

Figure 8:
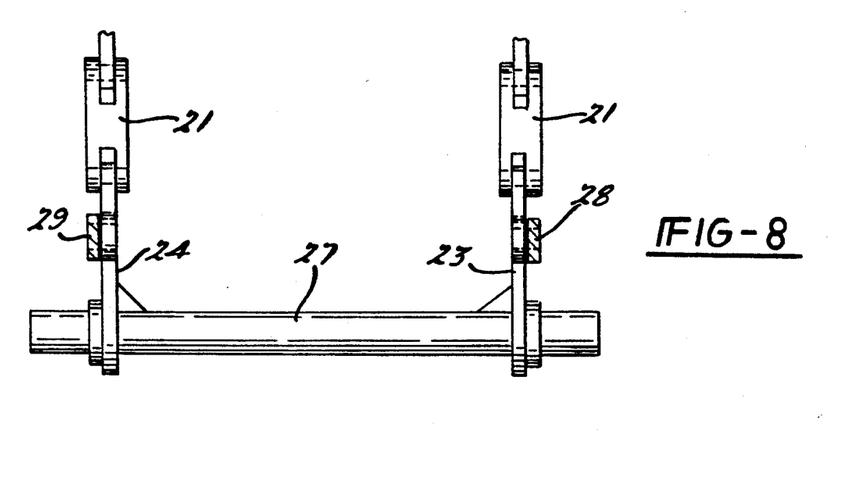
FIG. 8 is an elevational view taken along line 8—8 of FIG. 5.

Referring to FIGS. 9A and 9B it can be seen that throughout the four bar linkage cycle from the at rest position of FIG. 9A to the vertically extended position of FIG. 9B, none of the links cross over each other nor does any link cross over a bell crank. Therefore, the lifting links 21, the bell cranks 22 and 23, and the drag links 28 may be designed as seen in FIG. 8 having substantial interconnecting structure and yet be compact, sturdy and easily contained within the confines of the workpiece support table 13. Similar interconnecting structure is also provided between the forward pair of lifting links 21 associated with the bell cranks 24 and 25, thereby providing resistance to transverse loads that may be imparted to the workpiece support table 13 during the welding operation, i.e., loads which are transverse to the longitudinal direction of the workpiece support table as well as loads in the longitudinal direction of the workpiece support table.

Figure 12A:
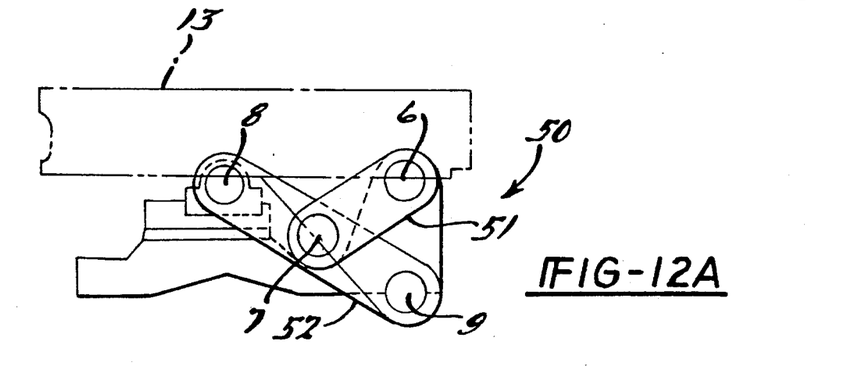
FIG. 12A illustrates a side view of a prior art Scott-Russell straight-line mechanism as embodied within the table lifting system in the fully lowered position.
Figure 12B:
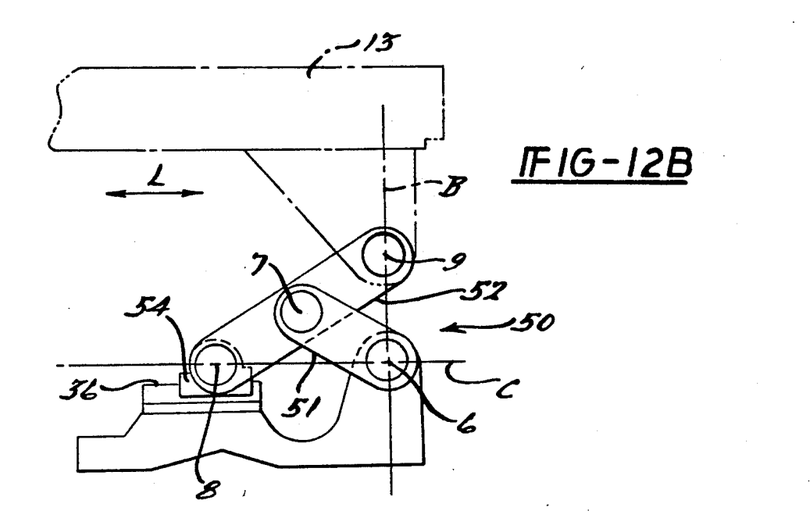
FIG. 12B is a side view of the Scott-Russell mechanism as embodied in the table lifting system in the fully raised position.

Although the four bar link mechanism shown in FIGS. 5, 6, 7, 9A, and 9B is not a straight-line mechanism, the locus of the pivot 5, in FIG. 9A, connecting the lifting link 21 to the attachment bracket 16 of the workpiece support table 13, is restricted to following a straight-line vertical path dictated by the attachment of the straight-line Scott-Russell mechanism 50 indicated in FIG. 5 and shown in detail in FIGS. 12A and 12B. Obviously, the other three table attachment brackets 16 and the workpiece support table are also restricted to follow straight-line paths.

It is to be noted, as shown in FIG. 9A, that when the four bar linkage mechanism is in the fully retracted position, the lever 34 of the bell crank assembly 31 and drive link 30 form a toggle or dwell mode. Similarly, when the four bar linkage mechanism is in its fully extended vertical position as shown in FIG. 9B, the lifting link 21 and the bell crank 22 form a toggle or dwell mode. Thus, the four bar linkage produces a toggle and dwell at each end of the full stroke employing a different combination of links of the four bar linkage mechanism for each dwell.

Figure 10:
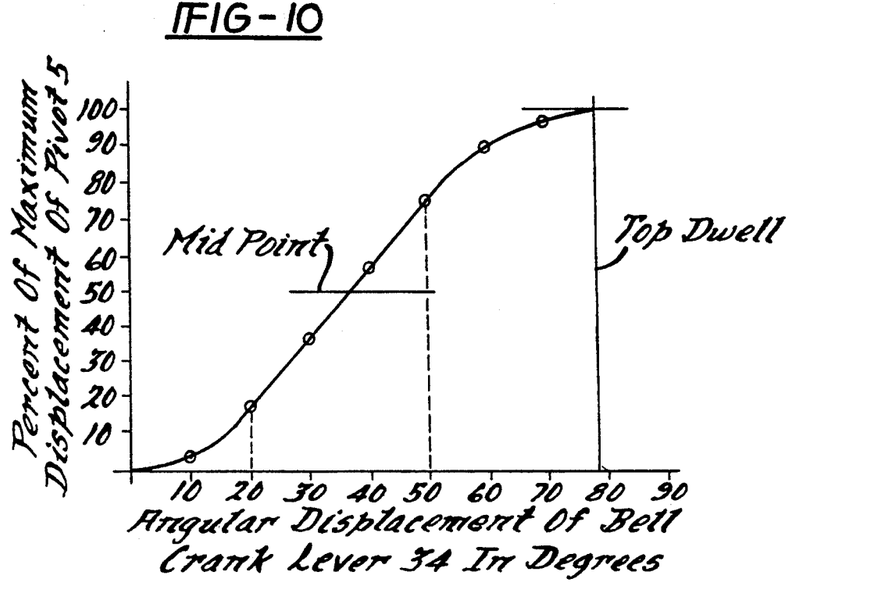
FIG. 10 shows a graphical kinematic representation of the workpiece support table displacement versus time for the improved four bar lifting linkage mechanism of the table lifting system.

FIG. 10 illustrates a graphical representation in the form of a curve plotting the vertical displacement for the pivot point 5 of the lifting link 21 versus the angular rotation of the lever 34 on the bell crank assembly 31. It is to be noted that the rate of change of displacement, of point 5, with respect to the angular rotation of the lever 34 is constant from approximately 20 degrees through approximately 50 degrees and that the mid stroke of the pivot point 5 of the lifting link 21 occurs near the midpoint of the total angular rotation of the lever 34 of the bell crank assembly.

Figure 11:
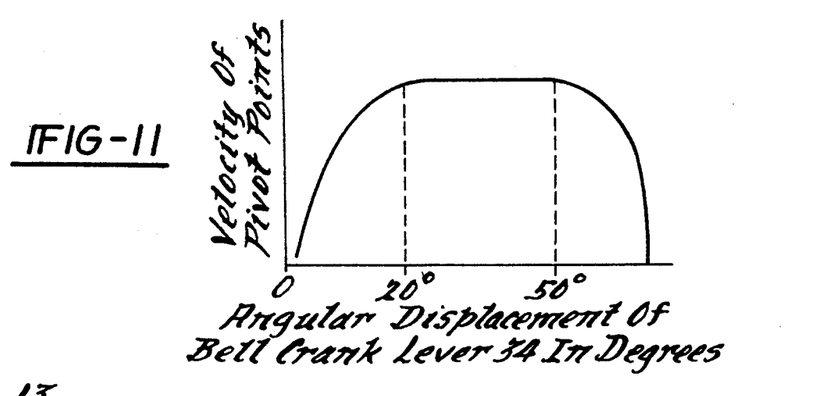
FIG. 11 shows a graphical kinematic representation of the workpiece support table velocity versus clock angle of the bell crank for the improved lifting linkage mechanism of the table lifting system.

Since the curve of FIG. 10 also represents distance versus time, and since the first derivative of distance with respect to time is velocity, it is then apparent that the velocity of the pivot point 5, and therefore the velocity of the workpiece support table 13, is nearly constant from approximately 20 degrees through 50 degrees of rotation of the lever 34. Thus, the harmonic velocity versus time curve for pivot point 5, and workpiece support table 13, has thereby been modified to incorporate a constant velocity range (zero acceleration) about an approximate mid stroke range as shown in FIG. 11. The advantage of this modified velocity profile will be further described below.

With reference to FIG. 11, because of the dwell created by the combination of the drive link 30 and the lever 34 at the bottom of the stroke as shown in FIG. 9A, the pivot point 5 accelerates, from zero velocity, very rapidly as the bell crank assembly 31 first begins to rotate counterclockwise to begin lifting the workpiece support table 13 as indicated in FIG. 11. Similarly, as the pivot point 5 approaches its end of stroke vertical displacement, the bell crank 22 and lifting link 21 rapidly approach a toggle or dwell position as shown in FIG. 9B resulting in a rapid deceleration to zero velocity as shown in FIG. 11. Between the rapid acceleration and rapid deceleration phase of the velocity curve, the velocity of the pivot point 5 is relatively constant as shown in FIG. 11. Thus, the four bar linkage provides the necessary deceleration and acceleration characteristics into and out of both end stroke dwell positions as well as a constant velocity characteristic during a midpoint range of travel, permitting the total disregard for the end of stroke dwells provided by the cycloidal drive mechanism and relying strictly on the four bar linkage to provide the end point dwell characteristics.

As earlier disclosed and with specific reference to FIGS. 12A and 12B, a Scott-Russell straight-line mechanism 50 substantially as shown is employed in combination with the four bar lift mechanism to provide the vertical straight-line movement of the workpiece support table 13. For additional information regarding the operation and kinematics of the particular Scott-Russell mechanism shown in FIG. 12 and other Scott-Russell straight-line mechanism embodiments, the reader is referred to U.S. Pat. No. 4,545,266, issued to John H. Brems, incorporated herein by reference. The particular Scott-Russell straight-line mechanism employed herein is shown in the above referenced Brems patent as prior art FIG. 1 and represents an old and well know Isosceles Sliding Block Linkage.

FIGS. 12A and 12B illustrate the specific configuration of the Scott-Russell mechanism as adapted for this application. FIG. 12A shows the Scott-Russell mechanism in the at rest position of the workpiece support table 13 as shown in FIGS. 1 and 7, and FIG. 12B shows the Scott-Russell mechanism in the vertically fully extended position of the workpiece support table 13 as shown in FIGS. 3, 5, and 6.

With reference to FIGS. 12A and 12B, a link 51 is connected to the welding press at the pivot point 6. The link 51 is also connected at the pivot point 7 to the midpoint of a link 52. One end of the link 52 is connected to a slider block 54 depicted by the pivot point 8. The slider block 54 and thereby the pivot point 8 is constrained to straight-line movement along a line C—C, passing through both of the pivot points 6 and 8 by a guide surface 36 located on the frame of the welding press. The outboard end of the link 52 as defined by the pivot point 9 will move along a perfectly straight and vertical line B, passing through the pivot point 6 which will at all times be perpendicular to the line C—C, passing through the pivot points 6 and 8, as the link 51 rotates about the pivot point 6, provided that the distances between the pivot points 6 and 7, the pivot points 8 and 7, and the pivot points 9 and 7 are all equal to each other. This is easily proven as the triangles 6, 7, 8 and 6, 7, 9 represent an isosceles triangle for all positions of the straight-line linkage.

By combining the four bar linkage mechanism, as taught herein, with the Scott-Russell mechanism described above, it is possible to obtain significant structural rigidity in the workpiece support table 13 when in the vertically extending position as shown in FIGS. 1, 5, and 6 since the rigidity is provided by the structural integrity of the combined bell cranks and by the torque tubes as well as the associated drag links and lifting links. As stated above, since the four bar lift mechanism has no cross over links throughout its operational cycle, the lifting links 21 and the supporting bell cranks and associated torque tubes may be structurally designed to withstand significant transverse loads. Although the four bar linkage mechanism is limited in structural rigidity in the longitudinal direction, namely parallel to the drag links 28 and 29, the Scott-Russell mechanism combined with the four bar linkage provides the necessary longitudinal rigidity to counteract all known longitudinal forces induced by the tooling when it is performing work on the workpiece.

Referring to FIGS. 9B and 12B, which show the workpiece support table 13 in its fully raised position, it is seen that when a longitudinal load L is imparted to the workpiece support table and in turn to the pivot point 9 of the Scott-Russell mechanism, attached to the underside of the workpiece support table 13, the rigidity of the triangular links of the Scott-Russell mechanism combined with the rigidity of the herein disclosed four bar linkage mechanism cooperate to react to any such load. Upon application of a load L at the pivot point 9, the kinematics of the Scott-Russell mechanism allow only movement in the vertical direction along the line B. However, since the four bar lift linkage and the associated workpiece support table 13 is at its uppermost position, the toggle effect of the lifting link 21 and its supporting bell crank will not react to any downward movement, until clockwise rotation of the bell crank assembly 31 occurs. Therefore, maximum resistance to longitudinal loads in the fully upright position can be effectively resisted by combining the four bar linkage mechanism with the Scott-Russell straight-line motion mechanism.

As disclosed heretofore, the four bar linkage system structure produces end of stroke dwells but does not kinematically provide the desired mid stroke or intermediate dwell, where the workpiece support table 13 engages the workpiece 12 to lift it from the conveyor 11. This dwell is preferably provided by the cycloidal drive mechanism indicated as element 60 in FIG. 16. In the interest of brevity, a detailed explanation of the cycloidal mechanism will not be provided herein. The reader is directed to U.S. Pat. No. 3,789,676 issued to John H. Brems on Feb. 5, 1974, incorporated herein by reference, and specifically FIG. 12 which describes the cycloidal drive mechanism selected to drive the mechanical lifting mechanism.

Figure 13:
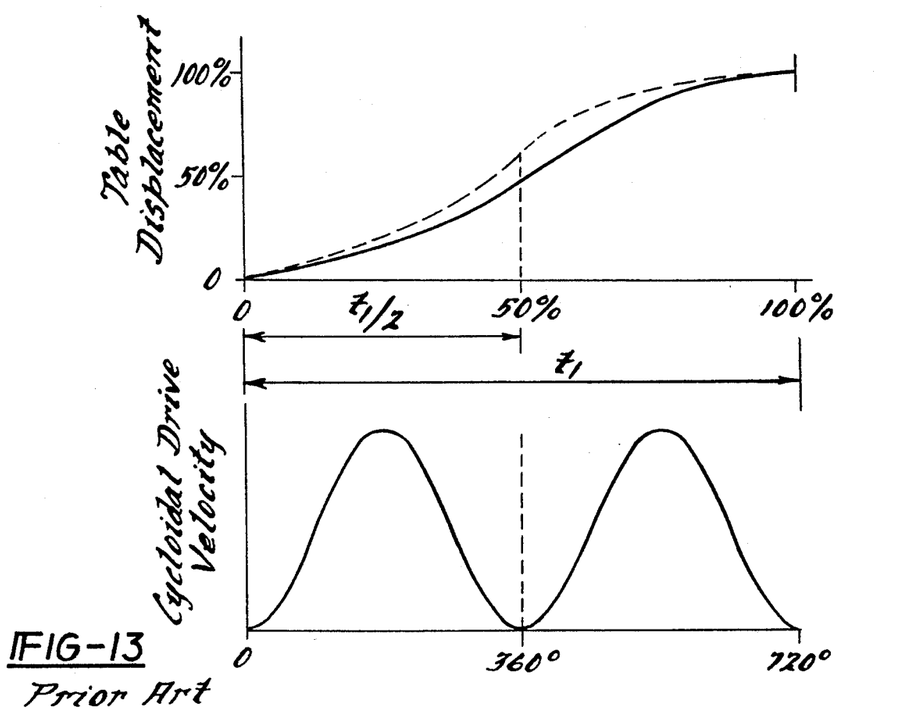
FIG. 13 illustrates a comparison of the table displacement versus time and table velocity versus clock angle of the prior art table lifting system utilizing a typical prior art cycloidal drive to obtain the dwells associated with the prior art mechanical welding press.

FIG. 13 illustrates the velocity versus time curve for a prior art cycloidal drive system as well as the displacement versus time curve typically found in prior art lifting systems using this cycloidal drive. The solid line curve of the displacement profile depicts a mechanical welding knee system characteristic having its mid stroke dwell (where the workpiece support table engages the workpiece lying on the conveyor) exactly at mid point of the total time stroke to complete the total stroke. As seen in FIG. 13 the cycloidal drive is relied upon to provide all three dwells, the end of stroke dwells as well as a dwell at the exact mid point in time of its total stroke. As FIG. 13 illustrates, the associated velocities and acceleration to enter and leave each dwell are also provided by the cycloidal drive.

Since the cycloidal drive must provide the acceleration ramps at the bottom end and top end of the total stroke and because of the inherent characteristics of the cycloidal drive, the mid stroke dwell must therefore occur at the mid point in time of the total time for a complete stroke, namely at 360 degrees clock angle, as well as at exactly one-half of the time ($t_1$) of the total time the drive takes to accomplish a complete stroke. The clock angle is the angle of rotation of the cycloidal drive output shaft. Thus the cycloidal drive must rotate through a full 720 degrees to accomplish one full stroke of the lift mechanism.

Figure 15:
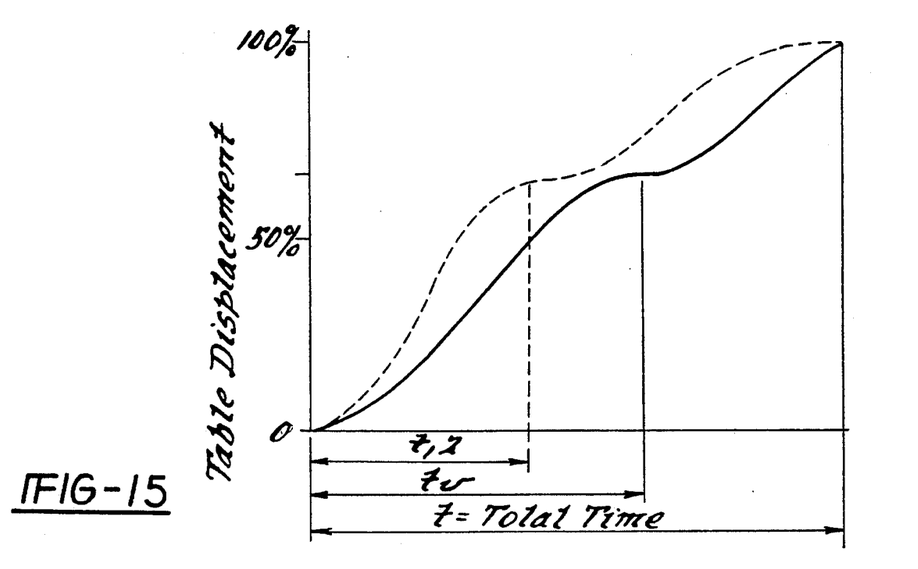
FIG. 15 illustrates a comparison of the table lifting system displacement versus time curve of the prior art with that of the present invention for a table lifting system having an intermediate dwell above the mid stroke position.

In the prior art mechanical welding knee, the kinematic characteristics may be modified by varying the ratio of the straight line linkage to locate the mid stroke dwell at a displacement somewhat greater than mid stroke, as shown by the broken line in FIG. 15. The mid stroke dwell, nevertheless, must occur at the mid point in time of the cycle time. Therefore, such a modification of the prior art lift linkage will be accompanied by an increase in the horsepower requirements to lift the workpiece support table to the higher mid stroke dwell position because the lift to mid stroke dwell must occur within the same given time period. Thus the prior art lift systems may move the mid stroke dwell in distance, but cannot move the mid stroke dwell in time since it must always occur at 360 degrees clock angle rotation, a characteristic of the cycloidal drive. However, since the improved four bar linkage mechanism as disclosed herein does not rely upon the cycloidal drive to provide the bottom and top dwells, the cycloidal velocity versus time curve of the cycloidal drive may be tuned or phase shifted with respect to time thereby providing a mechanical welding knee whereby the mid stroke dwell may be moved in both distance and time.

Figure 14:
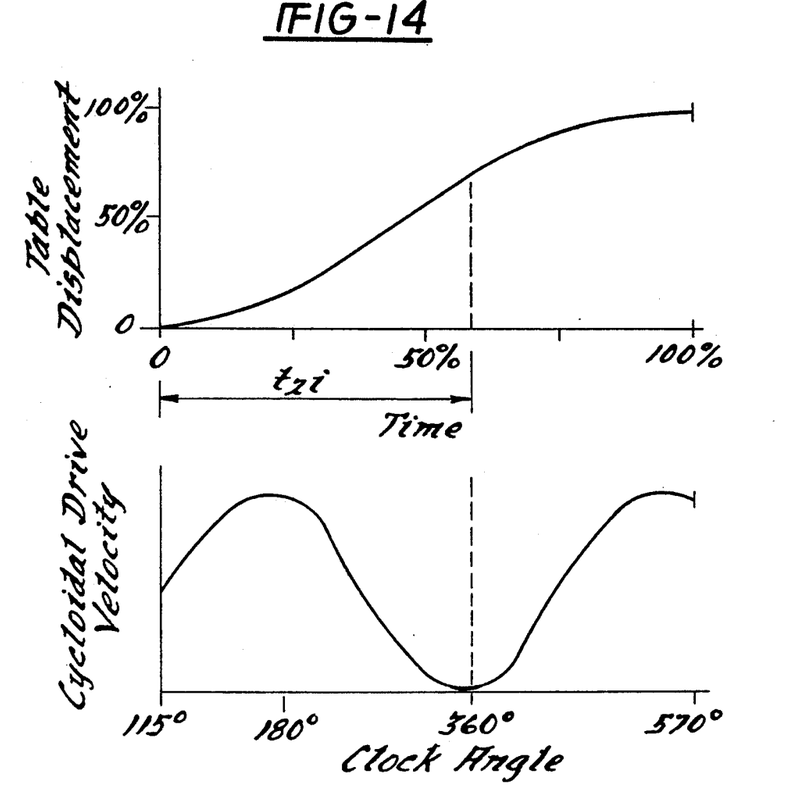
FIG. 14 illustrates a comparison of the workpiece support table displacement versus time with the phase shifted cycloidal drive velocity versus clock angle curve in accordance with the present invention wherein the four bar linkage is relied upon to generate the beginning and end of stroke dwells.

FIG. 14 illustrates the table displacement versus time curve for the improved four bar linkage mechanism as well as the velocity versus time curve for the cycloidal drive system driving the four bar linkage mechanism according to the invention. It is to be noted that since the four bar linkage mechanism need not rely upon the cycloidal drive to ramp into and out of the bottom and top dwells, the cycloidal drive system need not begin at zero clock angle nor end at the 720 degree clock angle. By employing the four bar linkage mechanism, having inherent bottom and top dwells, in combination with the cycloidal drive, the mid point or intermediate dwell may be positioned at any desired time $t_i$ within the total time cycle as shown in FIG. 14. Thus by the improved four bar linkage mechanism in combination with the cycloidal drive the intermediate point dwell, to pick up the workpiece from the conveyor, may be easily varied in time or distance by merely phase shifting the cycloidal drive velocity time curve to the left or to the right as viewed in FIG. 14.

Thus, as shown in FIG. 14, the cycloidal drive curve may be phase shifted such that at a time equal to zero, with the workpiece support table 13 in its at rest position (FIGS. 1, 7, and 9A) the cycloidal drive is indexed forward to begin at a clock angle of 115 degrees and arbitrarily end at 570 degrees. The cycloidal drive clock angle at the end of the lift cycle will be a function of the lever ratios of the bell crank assembly 31 and the herein described four bar lifting linkage mechanism 20.

FIG. 15 illustrates a comparison of workpiece support table displacement versus time curves for a lift system wherein the workpiece is engaged at the intermediate dwell position of approximately 67% or two thirds of the maximum stroke. The solid line depicts the displacement versus time for the improved four bar linkage mechanism drive by a cycloidal drive having a phase shifted time curve as shown in FIG. 14. The broken line depicts the displacement versus time of a prior art linkage system driven by a cycloidal drive system as shown in FIG. 13. As seen in FIG. 15, the prior art lift system must make the lift to mid point dwell within time $t_1 = t/2$ or at the cycloidal drive's mid point cycle time as indicated in FIG. 13. However, using the improved four bar linkage and combination cycloidal drive lift system of the present invention the lift to the intermediate dwell position may occur over a variable time $t_v$ as indicated in FIG. 15. Alternatively, a shorter time $t_i$ (that is less than t/2) may be selected to pick up the workpiece before the table is displaced one-half of its travel.

Since horsepower HP is determined as:

$$HP = M \times D^2 / T^3$$

Where:
M = Mass
D = Distance
T = Time it is apparent that as a longer time is taken to lift the table to the intermediate dwell position, the denominator significantly increases, because time is taken to a third power resulting in a lower horsepower requirement to raise the table to the intermediate dwell. Although the time t has been shortened for the lift from the intermediate dwell to the end of travel dwell at the top position, the distance D, in the numerator has been significantly decreased. Thus a decrease in the total horsepower requirement may be realized over the total lift cycle using the four bar linkage mechanism when the mid stroke dwell is displaced from the exact mid point in time position.

Figures 17, 18:
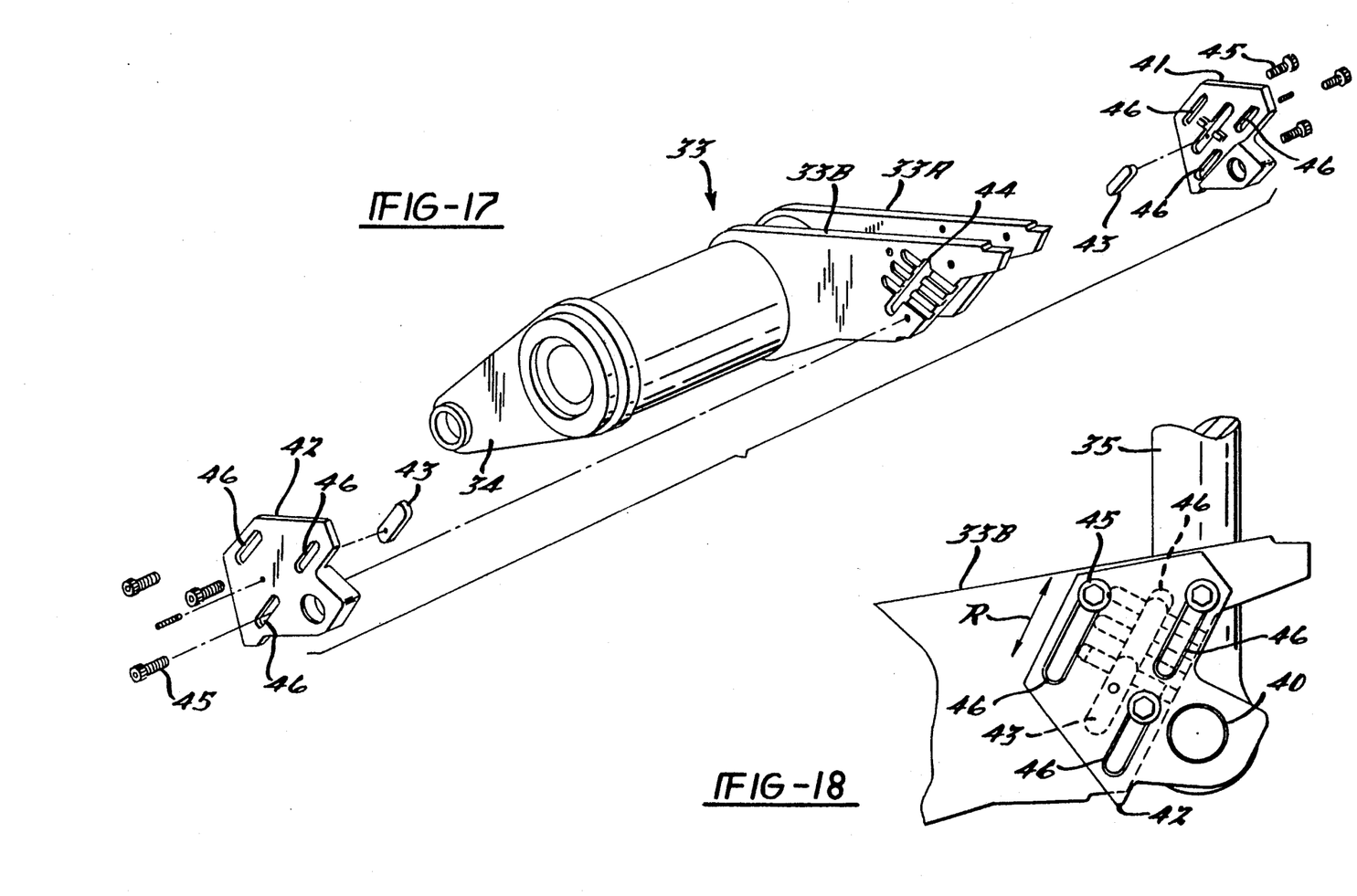
FIG. 17 illustrates an exploded perspective view of the intermediate dwell mechanical adjustment apparatus.
FIG. 18 illustrates a fragmentary elevational view of the intermediate dwell mechanical adjustment apparatus.

FIGS. 16, 17 and 18 illustrates a technique by which the lever arm ratio of lever 33 to lever 34 may be selectively changed to vary the intermediate dwell position of the workpiece support table 13 during its cycle.

FIG. 16 illustrates the cycloidal drive and its associated drive rod 35 attached to the lever 33 of the bell crank assembly 31 at an attachment point 409 located on two lever adjusting plates 41 and 42. As seen in FIG. 17, the lever 33 of the bell crank assembly 31 preferably consists of two parallel levers 33A and 33B affixed to the torque tube 32. Positioned on either side of the levers 33A and 33B are the two lever adjusting plates 41 and 42 which are affixed to the levers 33A and 33B, respectively, by suitable fasteners 45 extending through slots 46, as shown, the fasteners threadingly engaging the levers 33A and 33B. Further provided in the levers 33A and 33B are guide slots 44 slidingly receiving therein a guide pin 43 affixed to the lever adjusting plates 41 and 42.

As can be appreciated by the above description, the adjusting plates 41 and 42 may be translated along the direction as shown by the double arrow R, FIG. 18, the slots 46 upon partial loosening of the fasteners 45 and maintaining the guide pin 43 in the middle slot 46. Thus the lever arm M of the lever 33 as shown in FIG. 16 may be selectively increased or decreased to selectively vary the displacement of the intermediate point dwell. Accordingly, the intermediate point dwell is adjustable not only in the time t, by synchronizing the cycloidal drive start of cycle position with the linkage start of cycle position, but also in displacement by adjusting the adjusting plates 41 and 42 relative to the lever 33 to effect the lever arm M. Decreasing the lever arm M of the lever 33 will result in a greater angular rotation of the bell crank assembly 31 for a given linear displacement of the drive rod 35. Similarly, an increase in the length of the lever arm M of the lever 33 will decrease the angular rotation of the bell crank assembly 31 for a given linear displacement of the drive rod 35. Hence the intermediate dwell of the workpiece table support 13, as imposed by the combined kinematics of the lift linkage and cycloidal drive system, may also be mechanically selected to vary the displacement of the intermediate point dwell above or below the mid point in distance of the total stroke by selectively decreasing or increasing the length M of the lever 33, respectively. After selecting the desired position for the length of the lever arm M of the lever 33 a cross key and cross groove maintain the adjusting plates 41 and 42 in the selected position.

The invention has been shown and described as embodied in a vertical welding press. However, it is obvious to those skilled in the machine building art that the present invention may also be embodied in any machine having an intermediate mid point dwell requirement whether or not the machine embodies a straight line payload displacement.

Although the invention has been described in detail with reference to the illustrated preferred embodiment, variations and modifications exist within the scope and spirit of the invention as described and as defined in the following claims.

What is claimed is:

1. A mechanical linkage apparatus for moving a work table mounted above a base of a machine from a first or rest position, defining a first dwell, to a second or work position, defining a second dwell, said apparatus comprising:
    an input link;
    first bellcrank means pivotally attached to said input link, said first bellcrank means having a first pivot attached to said input link; a second pivot fixed to said base of said machine and a third pivot spaced from said first pivot and said second pivot;
    second bellcrank means spaced a predetermined distance from said first bellcrank means, said second bellcrank means having at least one bellcrank member defining a first pivot; a second pivot fixed to said base of said machine and a third pivot spaced from said first pivot and said second pivot;
    a drive link having one end pivotally attached to said third pivot of said first bellcrank means and an opposite end pivotally attached to said first pivot of said at least one bellcrank member of said second bellcrank means; and
    an output link having one end pivotally attached to said work table and an opposite end pivotally attached to said third pivot of said at least one bellcrank member of said second bellcrank means whereby as said input link is translated from said first position defining a first dwell of said mechanical linkage apparatus, said first bellcrank means is rotated about said second pivot fixed to said base of said machine and said drive link rotates said second bellcrank means about said second pivot of said second bellcrank means to move said work table attached to said output link to said second position defining said second dwell of said mechanical linkage apparatus.

2. An apparatus for establishing end of travel dwell points within a given machine cycle time t, defined by a complete displacement stroke from a first predetermined beginning of travel or bottom position to a second predetermined end of travel or top position, said apparatus comprising:
    a base;
    mechanical linkage means attached to said base, said mechanical linkage means having at least an input link at one end thereof and an output link at another opposite end thereof;
    first means for providing a dwell of said input link of said mechanical linkage means when said machine cycle time, t, is at said first predetermined beginning of travel or bottom position of said complete displacement stroke; and
    second means for providing a dwell of said output link of said mechanical linkage means when said machine cycle time, t, is at said second predetermined end of travel or top position of said complete displacement stroke.

3. The apparatus of claim 2 further comprising:
    means for establishing an intermediate dwell point at a machine cycle time greater than zero but less than said machine cycle time, t.

4. A method of establishing an intermediate dwell within a given machine cycle time t, said machine cycle time t being defined by a machine which produces a complete displacement stroke from a first predetermined beginning of stroke or bottom position to a second predetermined end of stroke or top position, said method comprising the steps of:
    providing a mechanical linkage means having velocity characteristics which provide a dwell at said first predetermined beginning of stroke position and a dwell at said second predetermined end of stroke position of said complete displacement stroke;
    driving said mechanical linkage means with a cycloidal drive input means having velocity characteristics which provide a dwell at said first predetermined beginning of stroke position; a dwell at said second predetermined end of stroke position and a mid stroke dwell at the precise midpoint in time of said machine cycle time t; and
    synchronizing said cycloidal drive input means velocity characteristics with said mechanical linkage means velocity characteristics such that the cycloidal drive beginning of travel position starts at a clock angle greater than zero (0°) degrees but less than three hundred sixty (360°) degrees when said mechanical linkage means is at said first predetermined beginning of stroke or bottom position thereby selectively phase shifting said cycloidal drive input means mid stroke dwell relative to said first predetermined beginning of stroke dwell of said mechanical linkage means to provide an intermediate dwell point within said given machine cycle time t between one of said first predetermined beginning of stroke position and cycloidal drive mid stroke dwell and said second predetermined end of stroke position and cycloidal drive mid stroke dwell.

5. A machine having a conveyor extending therethrough for carrying a workpiece and a work station located within said machine above a portion of said conveyor, said machine comprising:
    means for supporting said workpiece, said support means being mounted underneath said work station within said machine;
    means for lifting said support means, said lifting means being connected to said support means and associated workpiece to lift said workpiece from said conveyor to said work station to perform work on said workpiece, said means for lifting subsequently lowering said workpiece from said work station to said conveyor, said means for lifting having a displacement stroke beginning at a first predetermined bottom position below said conveyor and ending at a second predetermined top position nearer said work station when work is performed on said workpiece, said means for lifting further comprising:

a base;

a first pair of links having one end pivotally connected to said means for supporting said workpiece;

a second pair of links spaced from said first pair of links and pivotally having one end connected to said means for supporting said workpiece;

each link of said first pair and second pair of links having one end defining first pivot means, said first pivot means of each said link being attached to said means for supporting said workpiece, each link of said first pair and second pair of links further having an opposite end defining second pivot means, said second pivot means being spaced from said first pivot means by a first distance;

a first pair of bellcrank members pivotally attached to said base;

a second pair of bellcrank members spaced from said first pair of bellcrank members and pivotally attached to said base;

means for rigidly interconnecting each bellcrank member of each of said first and second pair of bellcrank members in axially spaced apart relation whereby each bellcrank member of said first and second pair of bellcrank members are constrained to move in concert with one another;

each bellcrank member of said first pair and second pair of bellcrank members comprising:

a first pivot bearing;

a second pivot bearing attached to said base; and a third pivot bearing adjoining a respective one of said each second pivot means on said opposite end of each said link of said first and second pair of links;

at least one drag link having one end pivotally attached to said first pivot bearing of one of said first pair of bellcrank members and an opposite end pivotally attached to said first pivot bearing of one of said second pair of bellcrank members;

an input link spaced a predetermined distance from said first pair and second pair of bellcrank members;

an input bellcrank member interposed said input link and one of said first and second pairs of bellcrank members; said input bellcrank member having a first pivot bearing attached to said input link; a second pivot bearing attached to said base; and a third pivot bearing spaced from said first and second pivot bearings; and a drive link having one end mounted to said pivot bearing of one of said first pair and second pair of bellcrank members whereby as said input link is translated said support means begins to move from a first position defining a first dwell of said means for lifting said support means while said input bellcrank member is rotated about said second pivot bearing fixed to said base of said machine and said drive link rotates said one of said first pair and second pair of bellcrank members about said second pivot bearing of said input bellcrank member to move said means for supporting said workpiece attached to said first and second pair of links to a second position defining a second dwell of said means for lifting.

6. The machine as claimed in claim 5 further comprising means for establishing an intermediate dwell position between said first dwell and said second dwell.

7. The machine as claimed in claim 6 further comprising means for varying the position, in time, of said intermediate dwell between said first dwell and said second dwell of said means for lifting.

8. The machine as claimed in claim 5 further comprising straight line linkage means having one end connected to said means for supporting said workpiece and an opposite end to said base for constraining said means for supporting said workpiece to substantially straight line motion while said support means is moving from said first dwell position to said second dwell position.

9. The machine as claimed in claim 8 wherein said straight line linkage means is a Scott-Russell mechanism.

* * * * *

UNITED STATES PATENT AND TRADEMARK OFFICE
CERTIFICATE OF CORRECTION

PATENT NO. : 5,320,208
DATED : June 14, 1994
INVENTOR(S) : Arthur C. Mason

It is certified that error appears in the above-indentified patent and that said Letters Patent is hereby corrected as shown below:

Title page, item [57], line 1, after "teaches" insert ---- a ----.

item [57], line 10, delete "providing" insert ---- provide ----.

Column 3, line 36, after "at" insert ---- at ----.

Column 6, line 23, after "with" insert ---- the ----.

Column 12, line 51, after "18," insert ---- along ----.

Signed and Sealed this

Thirteenth Day of September, 1994

Attest:

BRUCE LEHMAN

Attesting Officer     Commissioner of Patents and Trademarks